(12) United States Patent
Ben Dayan et al.

(10) Patent No.: US 12,204,496 B2
(45) Date of Patent: *Jan. 21, 2025

(54) METADATA CONTROL IN A LOAD-BALANCED DISTRIBUTED STORAGE SYSTEM

(71) Applicant: Weka.IO LTD, Tel Aviv (IL)

(72) Inventors: Maor Ben Dayan, Tel Aviv (IL); Omri Palmon, Tel Aviv (IL); Liran Zvibel, Tel Aviv (IL)

(73) Assignee: Weka.IO Ltd. (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/501,329

(22) Filed: Nov. 3, 2023

(65) Prior Publication Data

US 2024/0061812 A1 Feb. 22, 2024

Related U.S. Application Data

(63) Continuation of application No. 18/073,080, filed on Dec. 1, 2022, now Pat. No. 11,847,098, which is a
(Continued)

(51) Int. Cl.
*G06F 11/07* (2006.01)
*G06F 11/20* (2006.01)
(Continued)

(52) U.S. Cl.
CPC ............ *G06F 16/176* (2019.01); *G06F 11/07* (2013.01); *G06F 11/2094* (2013.01);
(Continued)

(58) Field of Classification Search
CPC .. G06F 11/07; G06F 11/1666; G06F 11/3006; G06F 11/301; G06F 16/176
(Continued)

(56) References Cited

U.S. PATENT DOCUMENTS 10,162,843 B1 * 12/2018 Srivastav ............. G06F 3/0653
10,545,921 B2    1/2020 Ben Dayan et al.
(Continued)

OTHER PUBLICATIONS

Int'l Search Report and Written Opinion ApplnNo. PCT/IB2018/001006 mailed Mar. 8, 2019.
(Continued)

*Primary Examiner* — Chae M Ko
(74) *Attorney, Agent, or Firm* — McAndrews, Held & Malloy, Ltd.

(57) ABSTRACT

A plurality of computing devices are communicatively coupled to each other via a network, and each of the plurality of computing devices is operably coupled to one or more of a plurality of storage devices. A plurality of failure resilient address spaces are distributed across the plurality of storage devices such that each of the plurality of failure resilient address spaces spans a plurality of the storage devices. The plurality of computing devices maintains metadata that maps each failure resilient address space to one of the plurality of computing devices. The metadata is grouped into buckets. Each bucket is stored in a group of computing devices. However, only the leader of the group is able to directly access a particular bucket at any given time.

20 Claims, 7 Drawing Sheets

Related U.S. Application Data continuation of application No. 16/716,555, filed on Dec. 17, 2019, now Pat. No. 11,544,226, which is a continuation of application No. 15/670,189, filed on Aug. 7, 2017, now Pat. No. 10,545,921.

(51) Int. Cl.

| | | |
|---|---|---|
| *G06F 11/30* | (2006.01) | |
| *G06F 16/11* | (2019.01) | |
| *G06F 16/13* | (2019.01) | |
| *G06F 16/16* | (2019.01) | |
| *G06F 16/176* | (2019.01) | |
| *G06F 16/182* | (2019.01) | |
| *G06F 16/188* | (2019.01) | |
| *G06F 11/10* | (2006.01) | |

(52) U.S. Cl.
CPC ........ *G06F 11/3006* (2013.01); *G06F 11/301* (2013.01); *G06F 16/122* (2019.01); *G06F 16/13* (2019.01); *G06F 16/164* (2019.01); *G06F 16/182* (2019.01); *G06F 16/188* (2019.01); *G06F 11/1076* (2013.01); *G06F 2201/805* (2013.01); *G06F 2201/82* (2013.01)

(58) Field of Classification Search
USPC .................................................. 714/6.2, 6.3
See application file for complete search history.

(56) References Cited

U.S. PATENT DOCUMENTS

| | | |
|---|---|---|
| 2006/0248088 A1 | 11/2006 | Kazar et al. |
| 2007/0208780 A1 | 9/2007 | Anglin et al. |
| 2010/0057923 A1 | 3/2010 | Vladimir et al. |
| 2011/0191300 A1 | 8/2011 | Orenstein et al. |
| 2012/0084506 A1 | 4/2012 | Colgrove et al. |
| 2013/0179481 A1 | 7/2013 | Halevy |
| 2014/0330785 A1 | 11/2014 | Isherwood et al. |
| 2016/0041878 A1 | 2/2016 | Davis et al. |
| 2017/0046268 A1 | 2/2017 | Ummadi et al. |
| 2017/0052847 A1 | 2/2017 | Ben Dayan et al. |
| 2017/0097771 A1 | 4/2017 | Krishnamachari et al. |
| 2017/0235950 A1* | 8/2017 | Gopalapura Venkatesh ................ G06F 11/2058 726/24 |
| 2018/0004745 A1* | 1/2018 | Finkelstein ......... G06F 16/2255 |

OTHER PUBLICATIONS

Niazi et al. "HopsFS: Scaling Hierarchical File System Metadata Using NewSQL Databases." In: 15th USENIX Conference on File and storage Technologies (FAST '17).Mar. 2, 2017 (Mar. 2, 2017) Retrieved on Feb. 17, 2019 (Feb. 17, 2019) from https:Ilwww .usenix.org/system/files/conference/fast17/fast17 -niazi.pdf. entire document.

Int'l Preliminary Report on Patentability Appln No. PCT/IB2018/ 001006 mailed Feb. 20, 2020 (8 pgs).

European Office Communication with partial supplemental Search Report Appln No. 18843334 dated Apr. 1, 2021.

European Office Communication with extended Search Report Appln No. 18843334 dated Jul. 8, 2021.

European Office Communication with extended Search Report Appln No. 23189097.1 dated Nov. 3, 2023.

Ezra N Hoch et al: "Bizur: A Key-value Consensus Algorithm for Scalable File-systems", arxiv.org, Cornell University Library, 201 OLIN Library Cornell University Ithaca, NY 14853, Feb. 14, 2017 (Feb. 14, 2017), XP080745726.

European Office Communication with extended Search Report Appln No. 18871443.0 dated Jul. 6, 2021.

\* cited by examiner

METADATA CONTROL IN A LOAD-BALANCED DISTRIBUTED STORAGE SYSTEM

The present application is a continuation of U.S. application Ser. No. 18/073,080, filed Dec. 1, 2022, which is a continuation of U.S. application Ser. No. 16/716,555, filed Dec. 17, 2019 (now U.S. Pat. No. 11,544,226), which is a continuation of U.S. application Ser. No. 15/670,189, filed Aug. 7, 2017 (now U.S. Pat. No. 10,545,921). The aforementioned documents are hereby incorporated herein by reference in their its entirety.

BACKGROUND

Limitations and disadvantages of conventional approaches to data storage will become apparent to one of skill in the art, through comparison of such approaches with some aspects of the present method and system set forth in the remainder of this disclosure with reference to the drawings.

INCORPORATION BY REFERENCE

U.S. patent application Ser. No. 15/243,519 titled "Distributed Erasure Coded Virtual File System" is hereby incorporated herein by reference in its entirety.

BRIEF SUMMARY

Methods and systems are provided for metadata control in load-balanced distributed storage system substantially as illustrated by and/or described in connection with at least one of the figures, as set forth more completely in the claims.

DETAILED DESCRIPTION

Traditionally, filesystems use a centralized control over the metadata structure (e.g., directories, files, attributes, file contents). If a local filesystem is accessible from a single server and that server fails, the filesystem's data may be lost if as there is no further protection. To add protection, some filesystems (e.g., as provided by NetApp) have used one or more pairs of controllers in an active-passive manner to replicate the metadata across two or more computers. Other solutions have used multiple metadata servers in a clustered way (e.g., as provided by IBM GPFS, Dell EMC Isilon, Lustre, etc.). However, because the number of metadata servers in a traditional clustered system is limited to small numbers, such systems are unable to scale.

The systems in this disclosure are applicable to small clusters and can also scale to many, many thousands of nodes. An example embodiment is discussed regarding non-volatile memory (NVM), for example, flash memory that comes in the form of a solid-state drive (SSD). The NVM may be divided into 4 kB "blocks" and 128 MB "chunks." "Extents" may be stored in volatile memory, e.g., RAM for fast access, backed up by NVM storage as well. An extent may store pointers for blocks, e.g., 256 pointers to 1 MB of data stored in blocks. In other embodiments, larger or smaller memory divisions may also be used. Metadata functionality in this disclosure may be effectively spread across many servers. For example, in cases of "hot spots" where a large load is targeted at a specific portion of the filesystem's namespace, this load can be distributed across a plurality of nodes.

Figure 1:
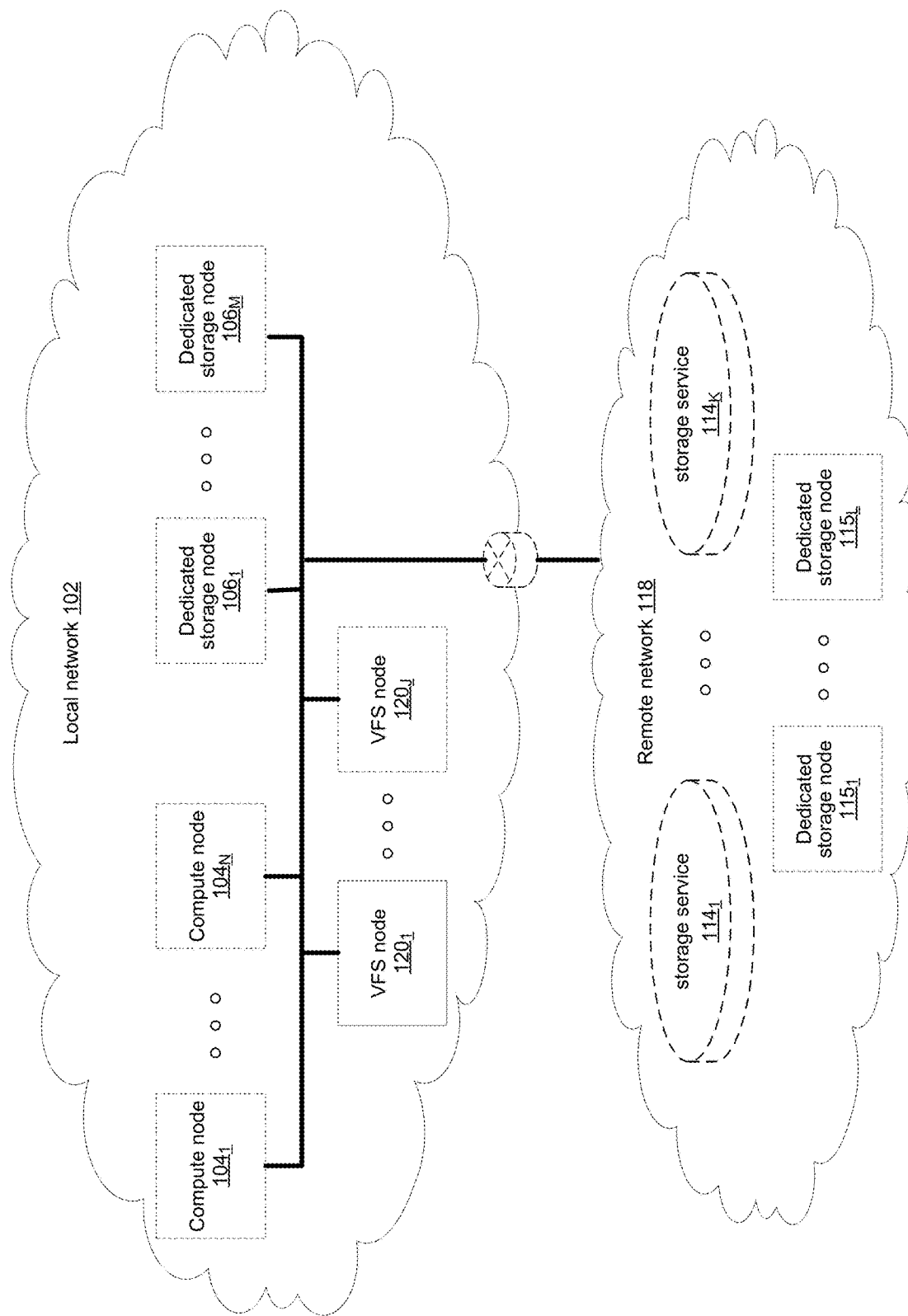
FIG. 1 illustrates various example configurations of a virtual file system in accordance with aspects of this disclosure.

FIG. 1 illustrates various example configurations of a virtual file system (VFS) in accordance with aspects of this disclosure. Shown in FIG. 1 is a local area network (LAN) 102 comprising one or more VFS nodes 120 (indexed by integers from 1 to J, for $j \geq 1$), and optionally comprising (indicated by dashed lines): one or more dedicated storage nodes 106 (indexed by integers from 1 to M, for $M \geq 1$), one or more compute nodes 104 (indexed by integers from 1 to N, for $N \geq 1$), and/or an edge router that connects the LAN 102 to a remote network 118. The remote network 118 optionally comprises one or more storage services 114 (indexed by integers from 1 to K, for $K \geq 1$), and/or one or more dedicated storage nodes 115 (indexed by integers from 1 to L, for $L \geq 1$).

Each VFS node $120_j$ (j an integer, where $1 \leq j \leq J$) is a networked computing device (e.g., a server, personal computer, or the like) that comprises circuitry for running VFS processes and, optionally, client processes (either directly on an operating system of the device $104_n$ and/or in one or more virtual machines running in the device $104_n$).

The compute nodes 104 are networked devices that may run a VFS frontend without a VFS backend. A compute node 104 may run VFS frontend by taking an SR-IOV into the NIC and consuming a complete processor core. Alternatively, the compute node 104 may run the VFS frontend by routing the networking through a Linux kernel networking stack and using kernel process scheduling, thus not having the requirement of a full core. This is useful if a user does not want to allocate a complete core for the VFS or if the networking hardware is incompatible with the VFS requirements.

Figure 2:
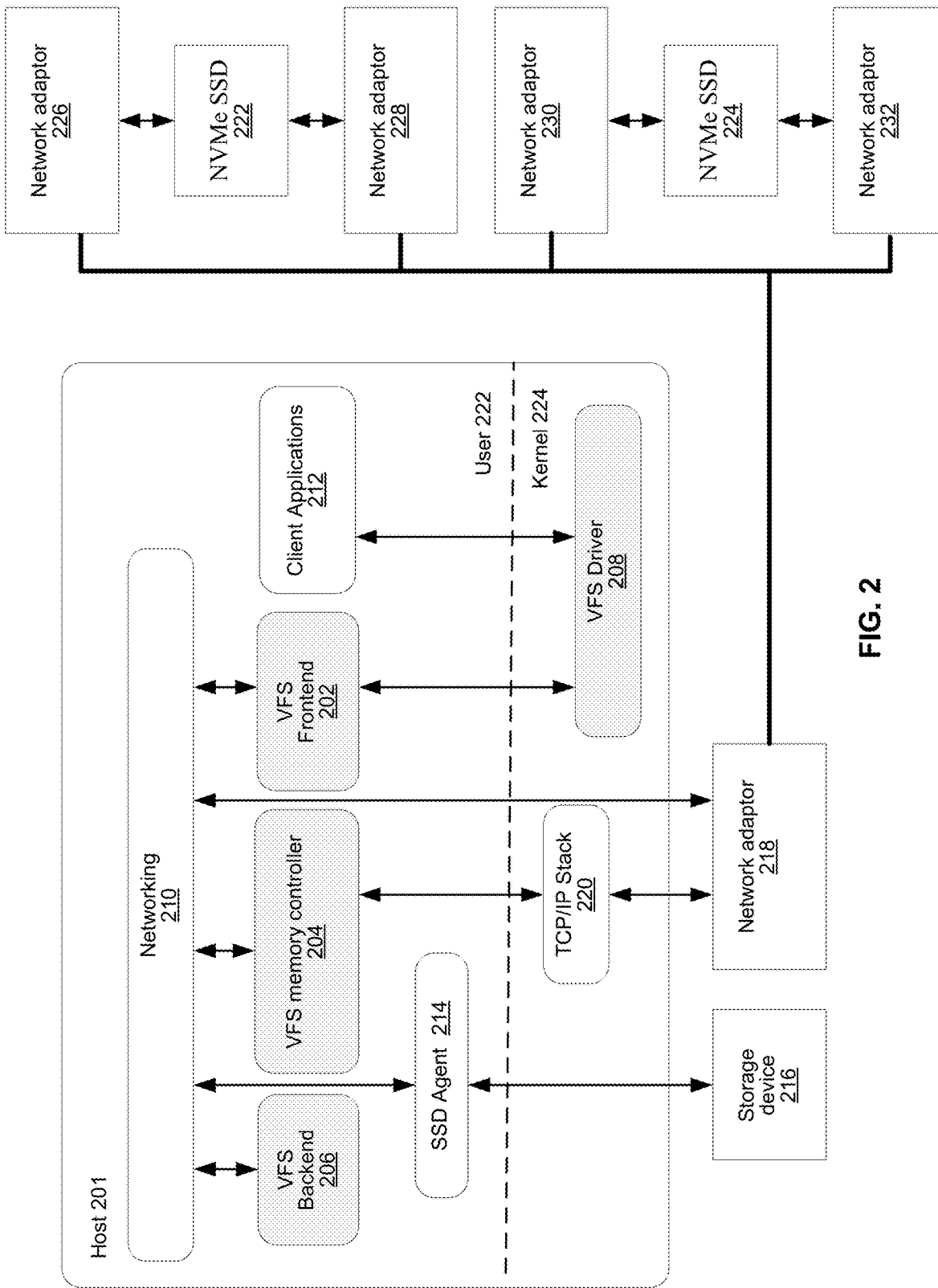
FIG. 2 illustrates an example configuration of a virtual file system node in accordance with aspects of this disclosure.

FIG. 2 illustrates an example configuration of a VFS node in accordance with aspects of this disclosure. A VFS node comprises a VFS frontend 202 and driver 208, a VFS memory controller 204, a VFS backend 206, and a VFS SSD agent 214. As used in this disclosure, a "VFS process" is a process that implements one or more of: the VFS frontend 202, the VFS memory controller 204, the VFS backend 206, and the VFS SSD agent 214. Thus, in an example implementation, resources (e.g., processing and memory resources) of the VFS node may be shared among client processes and VFS processes. The processes of the VFS may be configured to demand relatively small amounts of the resources to minimize the impact on the performance of the client applications. The VFS frontend 202, the VFS memory controller 204, and/or the VFS backend 206 and/or the VFS SSD agent 214 may run on a processor of the host 201 or on a processor of the network adaptor 218. For a multi-core processor, different VFS process may run on different cores, and may run a different subset of the services. From the perspective of the client process(es) 212, the interface with the virtual file system is independent of the particular physical machine(s) on which the VFS process(es) are running. Client processes only require driver 208 and frontend 202 to be present in order to serve them.

The VFS node may be implemented as a single tenant server (e.g., bare-metal) running directly on an operating system or as a virtual machine (VM) and/or container (e.g., a Linux container (LXC)) within a bare-metal server. The VFS may run within an LXC container as a VM environment. Thus, inside the VM, the only thing that may run is the LXC container comprising the VFS. In a classic bare-metal environment, there are user-space applications and the VFS runs in an LXC container. If the server is running other containerized applications, the VFS may run inside an LXC container that is outside the management scope of the container deployment environment (e.g. Docker).

The VFS node may be serviced by an operating system and/or a virtual machine monitor (VMM) (e.g., a hypervisor). The VMM may be used to create and run the VFS node on a host 201. Multiple cores may reside inside the single LXC container running the VFS, and the VFS may run on a single host 201 using a single Linux kernel. Therefore, a single host 201 may comprise multiple VFS frontends 202, multiple VFS memory controllers 204, multiple VFS backends 206, and/or one or more VFS drivers 208. A VFS driver 208 may run in kernel space outside the scope of the LXC container.

A single root input/output virtualization (SR-IOV) PCIe virtual function may be used to run the networking stack 210 in user space 222. SR-IOV allows the isolation of PCI Express, such that a single physical PCI Express can be shared on a virtual environment and different virtual functions may be offered to different virtual components on a single physical server machine. The I/O stack 210 enables the VFS node to bypasses the standard TCP/IP stack 220 and communicate directly with the network adapter 218. A Portable Operating System Interface for uniX (POSIX) VFS functionality may be provided through lockless queues to the VFS driver 208. SR-IOV or full PCIe physical function address may also be used to run non-volatile memory express (NVMe) driver 214 in user space 222, thus bypassing the Linux IO stack completely. NVMe may be used to access non-volatile storage media 216 attached via a PCI Express (PCIe) bus. The non-volatile storage media 220 may be, for example, flash memory that comes in the form of a solid-state drive (SSD) or Storage Class Memory (SCM) that may come in the form of an SSD or a memory module (DIMM). Other example may include storage class memory technologies such as 3D-XPoint.

The SSD may be implemented as a networked device by coupling the physical SSD 216 with the SSD agent 214 and networking 210. Alternatively, the SSD may be implemented as a network-attached NVMe SSD 222 or 224 by using a network protocol such as NVMe-oF (NVMe over Fabrics). NVMe-oF may allow access to the NVMe device using redundant network links, thereby providing a higher level or resiliency. Network adapters 226, 228, 230 and 232 may comprise hardware acceleration for connection to the NVMe SSD 222 and 224 to transform them into networked NVMe-oF devices without the use of a server. The NVMe SSDs 222 and 224 may each comprise two physical ports, and all the data may be accessed through either of these ports.

Each client process/application 212 may run directly on an operating system or may run in a virtual machine and/or container serviced by the operating system and/or hypervisor. A client process 212 may read data from storage and/or write data to storage in the course of performing its primary function. The primary function of a client process 212, however, is not storage-related (i.e., the process is only concerned that its data is reliably stored and is retrievable when needed, and not concerned with where, when, or how the data is stored). Example applications which give rise to such processes include: email servers, web servers, office productivity applications, customer relationship management (CRM), animated video rendering, genomics calculation, chip design, software builds, and enterprise resource planning (ERP).

A client application 212 may make a system call to the kernel 224 which communicates with the VFS driver 208. The VFS driver 208 puts a corresponding request on a queue of the VFS frontend 202. If several VFS frontends exist, the driver may load balance accesses to the different frontends, making sure a single file/directory is always accessed via the same frontend. This may be done by "sharding" the frontend based on the ID of the file or directory. The VFS frontend 202 provides an interface for routing file system requests to an appropriate VFS backend based on the bucket that is responsible for that operation. The appropriate VFS backend may be on the same host or it may be on another host.

The VFS backend 206 hosts several buckets, each one of them services the file system requests that it receives and carries out tasks to otherwise manage the virtual file system (e.g., load balancing, journaling, maintaining metadata, caching, moving of data between tiers, removing stale data, correcting corrupted data, etc.)

The VFS SSD agent 214 handles interactions with a respective storage device 216. This may include, for example, translating addresses, and generating the commands that are issued to the storage device (e.g., on a SATA, SAS, PCIe, or other suitable bus). Thus, the VFS SSD agent 214 operates as an intermediary between a storage device 216 and the VFS backend 206 of the virtual file system. The SSD agent 214 could also communicate with a standard network storage device supporting a standard protocol such as NVMe-oF (NVMe over Fabrics).

Figure 3:
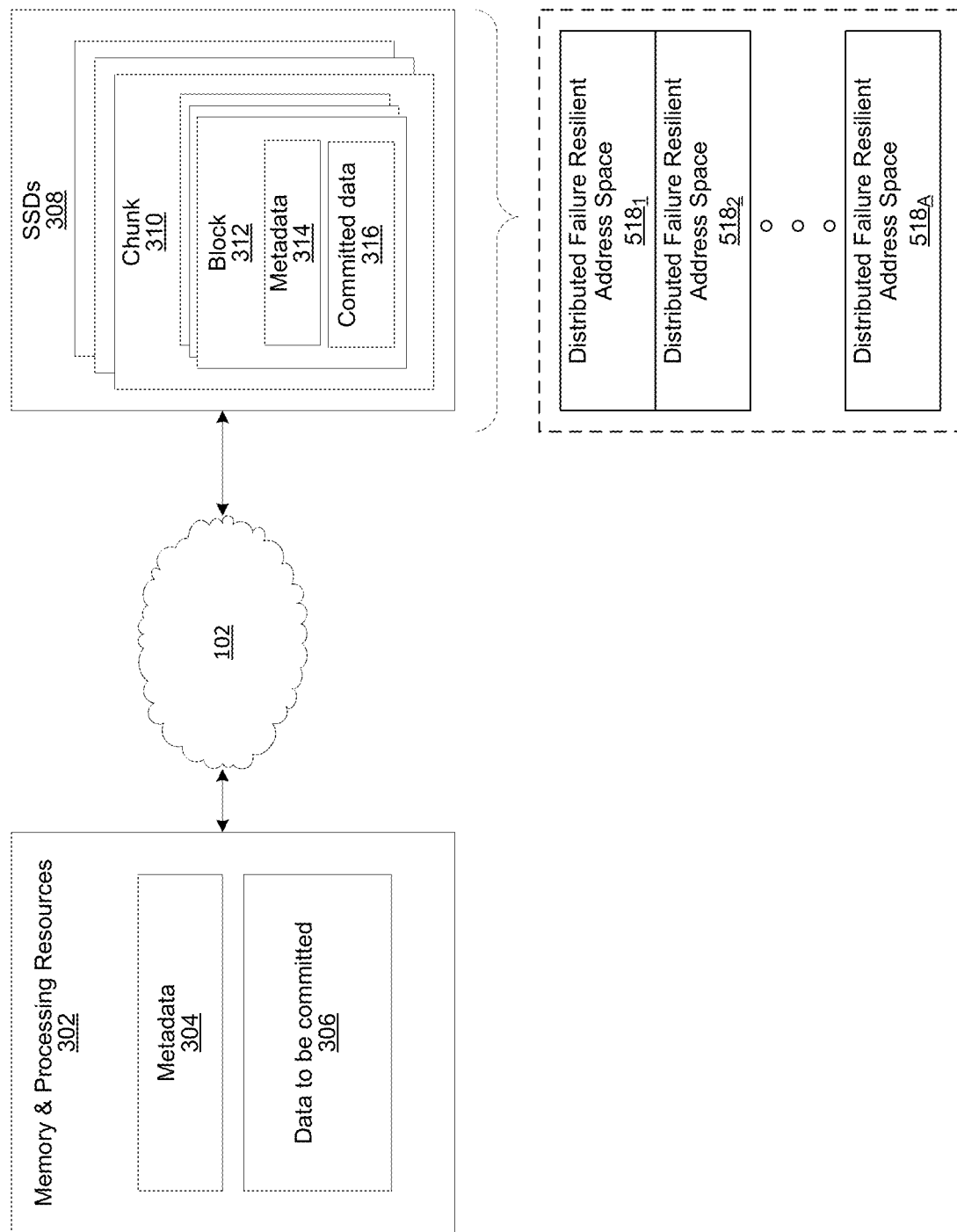
FIG. 3 illustrates another representation of a virtual file system in accordance with an example implementation of this disclosure.

FIG. 3 illustrates another representation of a virtual file system in accordance with an example implementation of this disclosure. In FIG. 3, the element 302 represents memory resources (e.g., DRAM and/or other short-term memory) and processing (e.g., x86 processor(s), ARM processor(s), NICs, ASICs, FPGAs, and/or the like) resources of various node(s) (compute, storage, and/or VFS) on which resides a virtual file system, such as described regarding FIG. 2 above. The element 308 represents the one or more physical storage devices 216 which provide the long term storage of the virtual file system.

As shown in FIG. 3, the physical storage is organized into a plurality of distributed failure resilient address spaces (DFRASs) 518. Each of which comprises a plurality of chunks 310, which in turn comprises a plurality of blocks 312. The organization of blocks 312 into chunks 310 is only a convenience in some implementations and may not be done in all implementations. Each block 312 stores committed data 316 (which may take on various states, discussed below) and/or metadata 314 that describes or references committed data 316.

The organization of the storage 308 into a plurality of DFRASs enables high performance parallel commits from many—perhaps all—of the nodes of the virtual file system (e.g., all nodes $104_1$-$104_N$, $106_1$-$106_M$, and $120_1$-$120_J$ of FIG. 1 may perform concurrent commits in parallel). In an example implementation, each of the nodes of the virtual file system may own a respective one or more of the plurality of DFRAS and have exclusive read/commit access to the DFRASs that it owns.

Each bucket owns a DFRAS, and thus does not need to coordinate with any other node when writing to it. Each bucket may build stripes across many different chunks on many different SSDs, thus each bucket with its DFRAS can choose what "chunk stripe" to write to currently based on many parameters, and there is no coordination required in order to do so once the chunks are allocated to that bucket. All buckets can effectively write to all SSDs without any need to coordinate.

Each DFRAS being owned and accessible by only its owner bucket that runs on a specific node allows each of the nodes of the VFS to control a portion of the storage 308 without having to coordinate with any other nodes (except during [re]assignment of the buckets holding the DFRASs during initialization or after a node failure, for example, which may be performed asynchronously to actual reads/commits to storage 308). Thus, in such an implementation, each node may read/commit to its buckets' DFRASs independently of what the other nodes are doing, with no requirement to reach any consensus when reading and committing to storage 308. Furthermore, in the event of a failure of a particular node, the fact the particular node owns a plurality of buckets permits more intelligent and efficient redistribution of its workload to other nodes (rather the whole workload having to be assigned to a single node, which may create a "hot spot"). In this regard, in some implementations the number of buckets may be large relative to the number of nodes in the system such that any one bucket may be a relatively small load to place on another node. This permits fine grained redistribution of the load of a failed node according to the capabilities and capacity of the other nodes (e.g., nodes with more capabilities and capacity may be given a higher percentage of the failed nodes buckets).

To permit such operation, metadata may be maintained that maps each bucket to its current owning node such that reads and commits to storage 308 can be redirected to the appropriate node.

Load distribution is possible because the entire filesystem metadata space (e.g., directory, file attributes, content range in the file, etc.) can be broken (e.g., chopped or sharded) into small, uniform pieces (e.g., "shards"). For example, a large system with 30 k servers could chop the metadata space into 128 k or 256 k shards.

Each such metadata shard may be maintained in a "bucket." Each VFS node may have responsibility over several buckets. When a bucket is serving metadata shards on a given backend, the bucket is considered "active" or the "leader" of that bucket. Typically, there are many more buckets than VFS nodes. For example, a small system with 6 nodes could have 120 buckets, and a larger system with 1,000 nodes could have 8 k buckets.

Each bucket may be active on a small set of nodes, typically 5 nodes that that form a penta-group for that bucket. The cluster configuration keeps all participating nodes up-to-date regarding the penta-group assignment for each bucket.

Each penta-group monitors itself. For example, if the cluster has 10 k servers, and each server has 6 buckets, each server will only need to talk with 30 different servers to maintain the status of its buckets (6 buckets will have 6 penta-groups, so 6*5=30). This is a much smaller number than if a centralized entity had to monitor all nodes and keep a cluster-wide state. The use of penta-groups allows performance to scale with bigger clusters, as nodes do not perform more work when the cluster size increases. This could pose a disadvantage that in a "dumb" mode a small cluster could actually generate more communication than there are physical nodes, but this disadvantage is overcome by sending just a single heartbeat between two servers with all the buckets they share (as the cluster grows this will change to just one bucket, but if you have a small 5 server cluster then it will just include all the buckets in all messages and each server will just talk with the other 4). The penta-groups may decide (i.e., reach consensus) using an algorithm that resembles the Raft consensus algorithm.

Each bucket may have a group of compute nodes that can run it. For example, five VFS nodes can run one bucket. However, only one of the nodes in the group is the controller/leader at any given moment. Further, no two buckets share the same group, for large enough clusters. If there are only 5 or 6 nodes in the cluster, most buckets may share backends. In a reasonably large cluster there many distinct node groups. For example, with 26 nodes, there are more than $$64,000 \left( \frac{26!}{5! * (26-5)!} \right)$$

possible five-node groups (i.e., penta-groups).

All nodes in a group know and agree (i.e., reach consensus) on which node is the actual active controller (i.e., leader) of that bucket. A node accessing the bucket may remember ("cache") the last node that was the leader for that bucket out of the (e.g., five) members of a group. If it accesses the bucket leader, the bucket leader performs the requested operation. If it accesses a node that is not the current leader, that node indicates the leader to "redirect" the access. If there is a timeout accessing the cached leader node, the contacting node may try a different node of the same penta-group. All the nodes in the cluster share common "configuration" of the cluster, which allows the nodes to know which server may run each bucket.

Each bucket may have a load/usage value that indicates how heavily the bucket is being used by applications running on the filesystem. For example, a server node with 11 lightly used buckets may receive another bucket of metadata to run before a server with 9 heavily used buckets, even though there will be an imbalance in the number of buckets used. Load value may be determined according to average response latencies, number of concurrently run operations, memory consumed or other metrics.

Redistribution may also occur even when a VFS node does not fail. If the system identifies that one node is busier than the others based on the tracked load metrics, the system can move (i.e., "fail over") one of its buckets to another server that is less busy. However, before actually relocating a bucket to a different host, load balancing may be achieved by diverting writes and reads. Since each write may end up on a different group of nodes, decided by the DFRAS, a node with a higher load may not be selected to be in a stripe to which data is being written. The system may also opt to not serve reads from a highly loaded node. For example, a "degraded mode read" may be performed, wherein a block in the highly loaded node is reconstructed from the other blocks of the same stripe. A degraded mode read is a read that is performed via the rest of the nodes in the same stripe, and the data is reconstructed via the failure protection. A degraded mode read may be performed when the read latency is too high, as the initiator of the read may assume that that node is down. If the load is high enough to create higher read latencies, the cluster may revert to reading that data from the other nodes and reconstructing the needed data using the degraded mode read.

Each bucket manages its own distributed erasure coding instance (i.e., DFRAS 518) and does not need to cooperate with other buckets to perform read or write operations. There are potentially thousands of concurrent, distributed erasure coding instances working concurrently, each for the different bucket. This is an integral part of scaling performance, as it effectively allows any large filesystem to be divided into independent pieces that do not need to be coordinated, thus providing high performance regardless of the scale.

Each bucket handles all the file systems operations that fall into its shard. For example, the directory structure, file attributes and file data ranges will fall into a particular bucket's jurisdiction.

An operation done from any frontend starts by finding out what bucket owns that operation. Then the backend leader, and the node, for that bucket is determined. This determination may be performed by trying the last-known leader. If the last-known leader is not the current leader, that node may know which node is the current leader. If the last-known leader is not part of the bucket's penta-group anymore, that backend will let the front end know that it should go back to the configuration to find a member of the bucket's penta-group. The distribution of operations allows complex operations to be handled by a plurality of servers, rather than by a single computer in a standard system.

If the cluster of size is small (e.g., 5) and penta-groups are used, there will be buckets that share the same group. As the cluster size grows, buckets are redistributed such that no two groups are identical.

Figure 4:
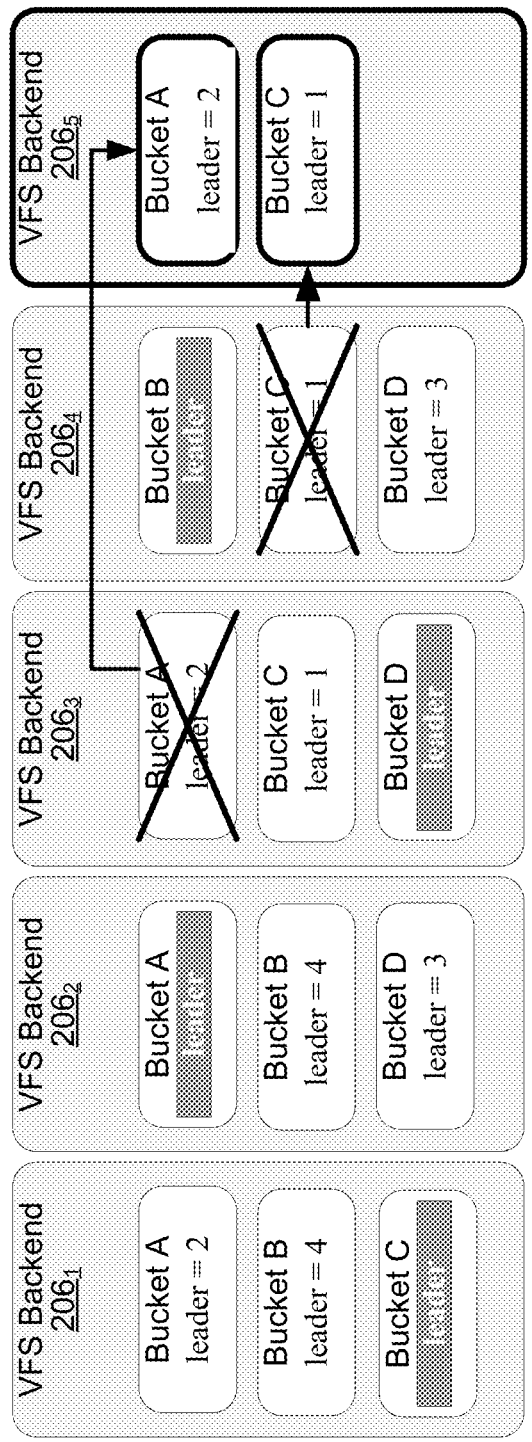
FIG. 4 illustrates an example of metadata bucket control in a load-balanced distributed storage system after a VFS is added in accordance with an example implementation of this disclosure.

FIG. 4 illustrates an example of metadata bucket control in a load-balanced distributed storage system after a VFS is added in accordance with an example implementation of this disclosure. With respect to FIGS. 4, 5, and 6, a three-member group is assumed for illustrative purposes. As discussed above, a group of VFS's may be any number. Because no two buckets in this example share the same group, the buckets can also be labeled according to their group. With four nodes, there are $$4\left(\frac{4!}{3!*(4-3)!}\right)$$

possible three-node groups. With five nodes, there are $$10\left(\frac{5!}{3!*(5-3)!}\right)$$

possible three-node groups. With six nodes, there are $$20\left(\frac{6!}{3!*(6-3)!}\right)$$

possible three-node groups.

FIG. 4 illustrates five VFS backends $206_1$-$206_5$. The first four VFS backends $206_1$-$206_4$ are present initially. The last backend VFS backend $206_5$ is added later. Four unique groups (A, B, C, and D) are initially formed in a cluster of the first four VFS backends $206_1$-$206_4$.

VFS backend $206_1$ initially comprises a group A bucket, a group B bucket and a group C bucket. The VFS comprising VFS backend $206_1$ is the leader of group C and is the only VFS that can access the DFRAS associated with the metadata in bucket C. VFS backend $206_2$ initially comprises a group A bucket, a group B bucket and a group D bucket, and the VFS comprising VFS backend $206_2$ is the leader of group A and is the only VFS that can access the DFRAS associated with the metadata in bucket A. VFS backend $206_3$ initially comprises a group A bucket, a group C bucket and a group D bucket, and the VFS comprising VFS backend $206_3$ is the leader of group D and is the only VFS that can access the DFRAS associated with the metadata in bucket D. VFS backend $206_4$ initially comprises a group B bucket, a group C bucket and a group D bucket, and the VFS comprising VFS backend $206_4$ is the leader of group B and is the only VFS that can access the DFRAS associated with the metadata in bucket B. Also, if a backend is not a group leader, it can identify the group leader.

Each time a new backend node joins the cluster, the groups for each bucket may be reconfigured, and the new groups' configuration is communicated to all current nodes. The configuration change may be performed such that the leader node of each group does not change, and no leader changes may be allowed while that new node is being added. This ensures that the overhead of such operation does not limit the overall performance of the system and does not impact the scalability.

After the new group's configuration is sent to all the nodes, it is deemed active, and that new node can now control some buckets as well. That new node will be part of one or more groups and may take responsibility for some of the buckets in order to make the cluster most load-balanced.

Several nodes may be added concurrently with one configuration re-calculation and communication. When all of the new nodes are added, workload may then re-spread across the new cluster's resources for all the buckets that are required for rebalancing. It may take a few load-balancing iterations for the system to stabilize to an optimal state when multiple nodes are added.

When the VFS backend $206_5$ joins the cluster, the groups for each bucket re-calculated, and the new group's configuration is communicated to all current nodes. As illustrated in FIG. 4, for example, bucket A from VFS backend $206_3$ and bucket C from VFS backend $206_4$ may be moved into VFS backend $206_5$ as a result of this reconfiguration.

Each bucket may be split in half to double the number of buckets. By increasing the number of buckets, the system is able to scale to support a bigger cluster of nodes. Also, if a single bucket ends up very busy (e.g., hot spotted), the buckets can be split in half until the single busiest bucket becomes small enough for one CPU core. Even though the data is cryptographically hashed and uniformly sharded across the buckets, still there could be a case where the workload is able to "attack" a single bucket with a lot of work. Being able to perform this splitting allows a relief for such cases.

Figure 5:
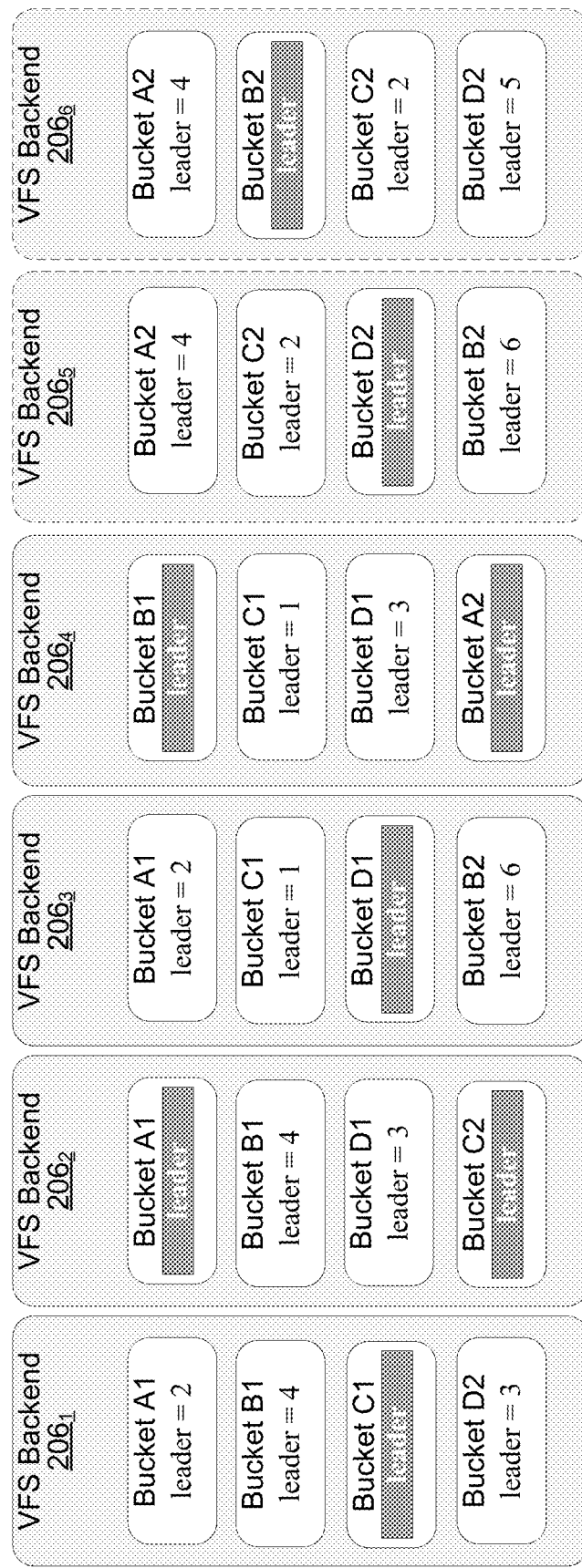
FIG. 5 illustrates an example of splitting metadata buckets in a load-balanced distributed storage system in accordance with an example implementation of this disclosure.

FIG. 5 illustrates an example of splitting metadata buckets in a load-balanced distributed storage system in accordance with an example implementation of this disclosure. FIG. 5 also illustrates an example where one backend is the leader for more than one bucket. For example, the second VFS backend $206_2$ is the leader for buckets A1 and C2. And buckets B1 and D1 are in the "standby" mode in VFS backend $206_2$.

The initial cluster of FIG. 4, comprising four VFS backends $206_1$-$206_4$ and group A, B, C and D buckets is assumed to be the starting point of FIG. 5. FIG. 5 adds two new VFS backends $206_5$ and $206_6$. Then, the group A, B, C and D buckets are each split, thereby forming group A1, A2, B1, B2, C1, C2, D1 and D2 buckets. The previous leaders of group A, B, C and D buckets are the leaders of group A1, B1, C1 and D1 buckets respectively. Group A2, B2, C2 and D2 buckets will start off being led by the same backends to preserve continuous operation, but are going to be quickly redistributed according to load into the four original VFS backends $206_1$-$206_4$ and the two new VFS backends $206_5$ and $206_6$.

If a server fails, that server's metadata shards (for which the server is the bucket leader) are moved to other servers based on their load. The redistribution can be determined according to how many buckets each node controls. For example, if each VFS node in a system controls 10 active buckets of metadata and one of the servers fails, the workload of 10 other servers will increase by 10%. The redistribution can also be determined according to actual load, similarly to a load balancing operation. The redistribution of buckets from a failed server may first fill the servers with the lowest current load. Load can be calculated by amount of operations each bucket handles, or by the latency of that bucket as perceived by its peers. Observing load by effective latency to peers accounts for cases outside the control of the system, such as congested networking links, etc. By moving the active buckets of the failed servers to the least busy servers, the load variability across all servers may be reduced. The ability to reduce load variability contributes to linear performance scalability.

Figure 6:
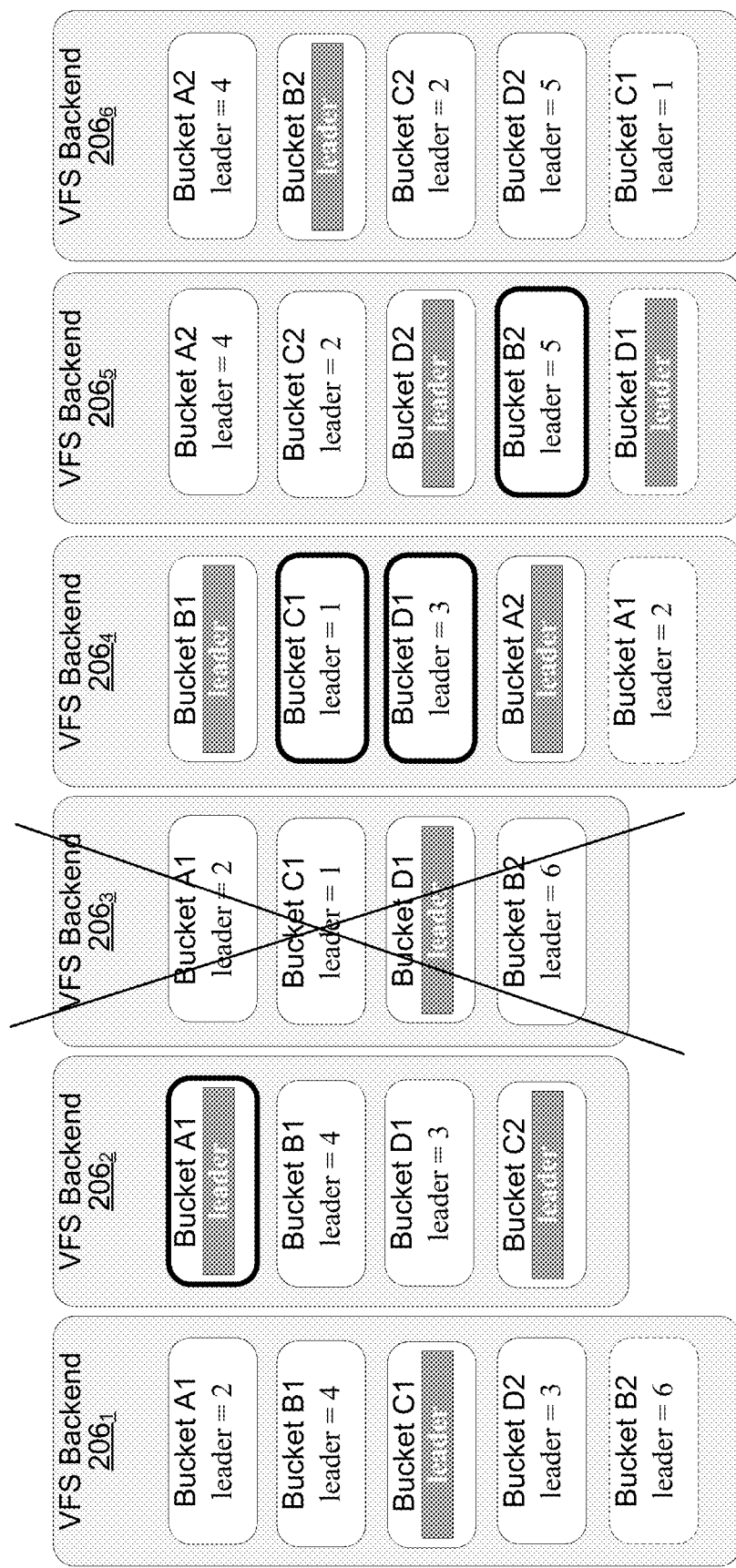
FIG. 6 illustrates an example of metadata control in a load-balanced distributed storage system after a VFS failure in accordance with an example implementation of this disclosure.

FIG. 6 illustrates an example of metadata control in a load-balanced distributed storage system after a VFS failure in accordance with an example implementation of this disclosure. Assume that VFS backends $206_3$ in FIG. 5 fails. As illustrated in FIG. 6, the buckets A1, C1, D1 and B2 are redistributed to VFS backends $206_4$, $206_6$, $206_5$, and $206_1$ respectively.

Figure 7:
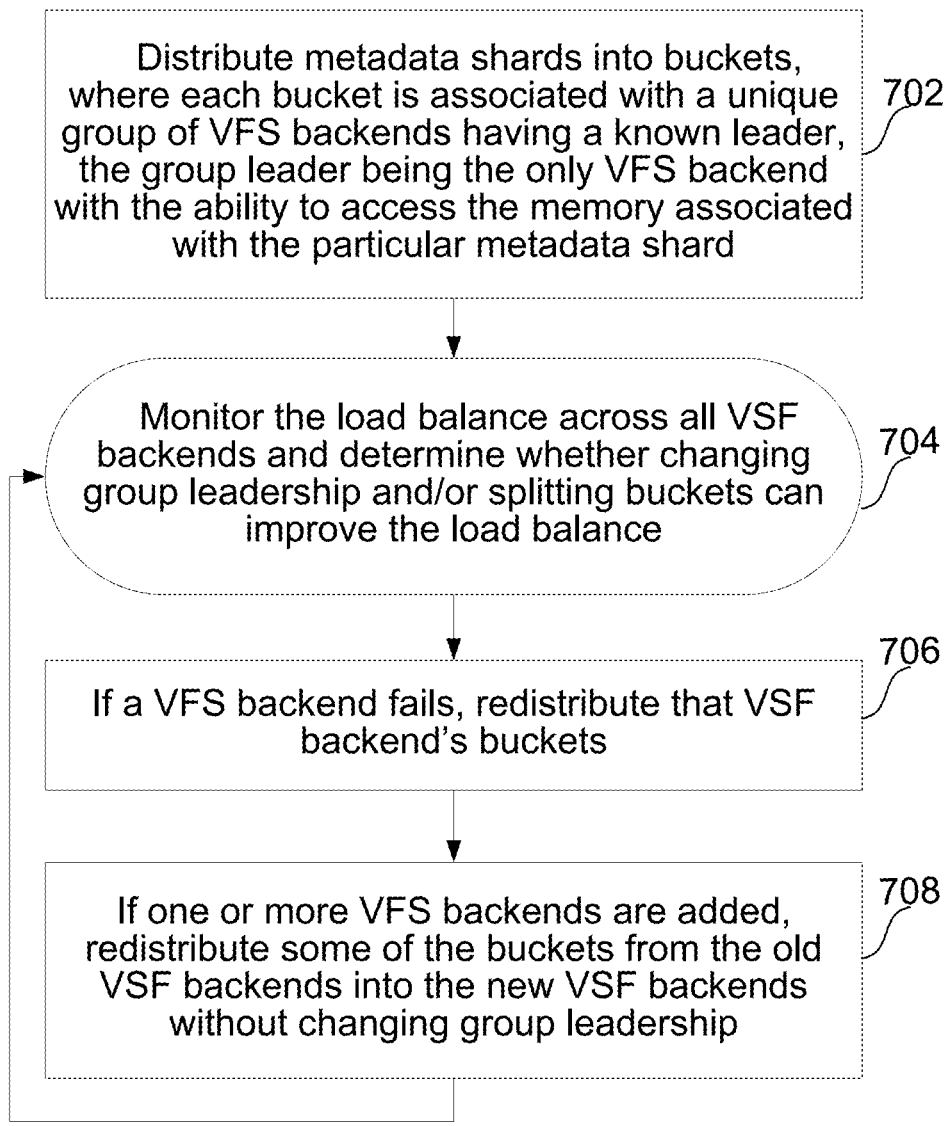
FIG. 7 is flowcharts illustrating an example method for metadata control in a load-balanced distributed storage system.

FIG. 7 is flowcharts illustrating an example method for metadata control in a load-balanced distributed storage system. In block 702, metadata shards are distributed into buckets, where each bucket is associated with a unique group of VFS backends having a known leader. The servers in each group decide among themselves which is best to run the buckets. There a lot of parallel small decisions, no central authority, as we try to have as little central decisions as we can. Once we let all nodes know what is the option to run (the centralized configuration of what nodes are present and the groups), all decisions become local to their groups. As discussed above, the group leader is the only VFS backend with the ability to access the memory associated with a particular metadata shard.

In block 704, the bucket leaders monitor the load balance across the backends and determine whether changing group leadership and/or splitting buckets can improve the load balance. In block 706, if a VFS backend fails, the buckets on that backend are redistributed. In block 708, if one or more VFS backends are added, the buckets from the previous VFS backends are redistributed into the new VFS backends without changing group leadership.

Each backend compares its own load (and its perceived load by the latency it provides to its peers) to the other backends it shares buckets with. If a backend notices that its load is too high, it would look across its lead bucket and all its peers and optimize what bucket move would make most sense. Even if the cluster comprises a large number of servers, each such local improvement may involve a smaller number of servers.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A method, comprising:
   for a bucket of a plurality of buckets:
   associating the bucket with a unique group of computing devices;
   selecting a particular computing device, of the unique group of computing devices, as a leader of the bucket associated with the unique group; and
   allowing access to a particular address space only by the leader of the bucket to which metadata associated with that particular address space has been distributed.

2. The method of claim 1, wherein the unique group of computing devices comprises a plurality of virtual file system (VFS) nodes.

3. The method of claim 1, wherein each unique group of computing devices comprises five VFS nodes of a plurality of VFS nodes.

4. The method of claim 1, wherein all VFS nodes in a unique group know and agree on the leader of the bucket.

5. The method of claim 1, wherein each address space has only one leader at any given time.

6. The method of claim 1, wherein the particular computing device is a leader of multiple buckets.

7. The method of claim 1, wherein the method comprises, in the event of a failure of one of the unique group of computing devices, redistributing metadata that was on the failed computing device.

8. The method of claim 1, wherein the method comprises, in the event of a change in a number of computing devices in the unique group of computing devices, redistributing metadata according to a load value associated with each computing device in the plurality of computing devices.

9. The method of claim 1, wherein the method comprises changing group leadership in the event of a load imbalance.

10. The method of claim 1, wherein the method comprises splitting and redistributing buckets of the plurality of buckets in the event of a load imbalance.

11. A system, the system comprising:
 a plurality of computing devices configured to distribute metadata into a plurality of buckets, wherein:
  a bucket, of the plurality of buckets, is associated with a unique group of computing devices of the plurality of computing devices,
  one computing device of the unique group of computing devices is selected as a leader of the bucket associated with the unique group, and
  access to a particular address space is allowed only by the leader of the bucket associated with the unique group of computing devices.

12. The system of claim 11, wherein the plurality of computing devices comprises a plurality of virtual file system (VFS) nodes.

13. The system of claim 11, wherein each unique group of computing devices comprises five VFS nodes of a plurality of VFS nodes.

14. The system of claim 11, wherein all VFS nodes in a unique group know and agree on the leader of the bucket.

15. The system of claim 11, wherein each address space is associated with only one leader at any given time.

16. The system of claim 11, wherein each of the computing devices is a leader of multiple buckets.

17. The system of claim 11, wherein in the event of a failure of one of the plurality of computing devices, metadata that was on the failed computing device is redistributed.

18. The system of claim 11, wherein in the event of a change in a number of computing devices in the plurality of computing devices, metadata is redistributed according to a load value associated with each computing device in the plurality of computing devices.

19. The system of claim 11, wherein group leadership is changed in the event of a load imbalance.

20. The system of claim 11, wherein one or more buckets of the plurality of buckets are split and redistributed in the event of a load imbalance.

* * * * *